US012499511B2

(12) United States Patent
Omi (10) Patent No.: US 12,499,511 B2
(45) Date of Patent: Dec. 16, 2025

(54) MEDICAL-IMAGE PROCESSING APPARATUS, MEDICAL-IMAGE PROCESSING METHOD, AND PROGRAM FOR THE SAME (71) Applicant: CANON KABUSHIKI KAISHA, Tokyo (JP)

(72) Inventor: Hiroyuki Omi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 18/295,079

(22) Filed: Apr. 3, 2023

(65) Prior Publication Data

US 2023/0237619 A1 Jul. 27, 2023

Related U.S. Application Data (63) Continuation of application No. PCT/JP2021/038606, filed on Oct. 19, 2021.

(30) Foreign Application Priority Data

Oct. 26, 2020 (JP) ................. 2020-179042

(51) Int. Cl.
*G06T 3/4053* (2024.01)
*G06N 3/09* (2023.01)
*G06T 3/4046* (2024.01)

(52) U.S. Cl.
CPC ............. *G06T 3/4053* (2013.01); *G06N 3/09* (2023.01); *G06T 3/4046* (2013.01)

(58) Field of Classification Search
CPC ....... G06T 3/4053; G06T 3/4046; G06N 3/09; G06N 3/048; G06N 3/0464; G06N 3/084; A61B 5/055; A61B 6/00
See application file for complete search history.

(56) References Cited

U.S. PATENT DOCUMENTS

| 2017/0148158 | A1 | 5/2017 | Najarian |
| 2017/0200067 | A1 | 7/2017 | Zhou |
| 2017/0213321 | A1 | 7/2017 | Matviychuk |
| 2019/0347772 | A1* | 11/2019 | Zhang ........................ G06T 5/60 |
| 2020/0286214 | A1 | 9/2020 | Kaneko |

FOREIGN PATENT DOCUMENTS

| CN | 111030952 A | | 4/2020 | |
| EP | 3764325 A1 | | 1/2021 | |
| JP | 4529804 B2 | | 8/2010 | |
| JP | 6276901 B1 | | 2/2018 | |
| JP | 2019212050 | * | 12/2019 | ............... G06T 3/40 |
| JP | 2019212050 A | | 12/2019 | |
| JP | 2020141908 A | | 9/2020 | |
| JP | 2020179041 A | | 11/2020 | |
| WO | 2016166199 A1 | | 10/2016 | |
| WO | 2019204406 A1 | | 10/2019 | |
| WO | 2020175446 A1 | | 9/2020 | |

* cited by examiner

*Primary Examiner* — Jonathan A Boyd
(74) *Attorney, Agent, or Firm* — Canon U.S.A., Inc., IP Division (57) ABSTRACT

A medical-image processing apparatus according to the present invention includes an obtaining unit configured to obtain a medical image obtained by capturing an image of an examinee and a generation unit configured to input the medical image to a learning model selected based on an operation mode of a sensor at the image capturing to generate a medical image of a higher resolution than a resolution of the medical image.

12 Claims, 8 Drawing Sheets

| Operation Mode | Addition Method | Thinning | Full Addition | Diagonal Addition | Thinning | Full Addition | Diagonal Addition | Thinning | Full Addition | Diagonal Addition |
|---|---|---|---|---|---|---|---|---|---|---|
| | Binning Count | 2 | 3 | 4 | 2 | 3 | 4 | 2 | 3 | 4 |
| Learning Model | Parameter Set | 1 | 2 | 3 | 4 | 5 | 6 | 7 | 8 | 9 |

FIG. 6B

Addition Method (1) THINNING     (2) FULL ADDITION     (3) DIAGONAL ADDITION

FIG. 7A

| OPERATION MODE | BINNING COUNT | 2 | 3 | 4 |
|---|---|---|---|---|
| LEARNING MODEL | CNN | X | Y | Z |
| | PARAMETER SET | x1 | y1 | z1 |

FIG. 7B

| OPERATION MODE | ADDITION METHOD | THINNING | FULL ADDITION | DIAGONAL ADDITION |
|---|---|---|---|---|
| LEARNING MODEL | TRAINING RATE | 0.0001 | 0.001 | 0.00001 |

MEDICAL-IMAGE PROCESSING APPARATUS, MEDICAL-IMAGE PROCESSING METHOD, AND PROGRAM FOR THE SAME

CROSS-REFERENCE TO RELATED APPLICATIONS

This application is a Continuation of International Patent Application No. PCT/JP2021/038606, filed Oct. 19, 2021, which claims the benefit of Japanese Patent Application No. 2020-179042, filed Oct. 26, 2020, both of which are hereby incorporated by reference herein in their entirety.

TECHNICAL FIELD

The present invention relates to a medical-image processing apparatus, a medical-image processing method, and a program for the same.

BACKGROUND ART

X-ray diagnosis and treatment based on radiography are widely performed in medical front, and digital diagnostic imaging based on radiographic images captured using a radiation detector (hereinafter referred to as "sensor") is in widespread use all over the world. The sensor can image output immediately and can therefore capture not only still images but also moving images. Furthermore, an increase in the resolution of the sensor allows imaging that provides more detailed information.

In contrast, reduced-resolution radiographic images are sometimes obtained to reduce radiation exposure to the examinee. One example is a use case in which X rays are applied for a long time, such as moving images. In this case, the sensor increases X-ray dose per pixel by operating using multiple pixels as one pixel. This allows the overall X-ray radiation to be reduced, thereby reducing radiation exposure to the examinee.

However, the reduction in resolution causes loss of detailed information in the radiographic images, such as lesion information and information for accurate positioning of the imaging apparatus.

One example of a process for decompressing detailed information in low-resolution images (increasing the resolution) is superresolution processing. Known examples of the superresolution processing include a method for converting multiple low-resolution images to a high-resolution image and a method for associating the features of a low-resolution image with the features of a high-resolution image and providing a high-resolution image on the basis of the information (PTL 1). A recent example method for associating features is machine learning. In particular, supervised learning using a convolutional neural network (CNN) is rapidly becoming popular because of their high performance (PTL 2). Superresolution processing using the CNN decompresses detailed information in input low-resolution images using learning parameters created by means of supervised learning. The superresolution processing is also applied to medical images.

Superresolution processing using the CNN makes an inference using a low-resolution image as an input and outputs a superresolution image as an inference. A high-resolution image is used as a training image for training. For this reason, multiple sets of a high-resolution image and a low-resolution image are prepared as training data. In learning, a method for generating a low-resolution image from a high-resolution image is learned. However, a method for generating a low-resolution image from a high-resolution image varies according to the operating method of the sensor. Using a CNN that has learned one generation method and using a low-resolution image generated using another generation method as an input for inference will result in a decrease in the quality of the superresolution image.

CITATION LIST

Patent Literature

PTL 1 Japanese Patent No. 4529804
PTL 2 Japanese Patent No. 6276901

SUMMARY OF INVENTION

The present invention is made in view of the above problems, and an object is to provide an apparatus and a method for processing medical images of appropriately improved resolution, and a program for the same.

Another object of the present invention is to offer operational advantages that are provided using the configurations of the following embodiments and that are not provided using known techniques.

A medical-image processing apparatus according to the present invention includes an obtaining unit configured to obtain a medical image obtained by capturing an image of an examinee and a generation unit configured to input the medical image to a learning model selected based on an operation mode of a sensor at the image capturing to generate a medical image of a higher resolution than a resolution of the medical image.

Further features of the present invention will become apparent from the following description of exemplary embodiments with reference to the attached drawings.

BRIEF DESCRIPTION OF DRAWINGS

FIGS. 6B(1), (2) and (3) are diagrams showing examples of an addition method according to the first embodiment.

DESCRIPTION OF EMBODIMENTS

The following embodiments illustrate a representative example in which radiographic images are used as an example of medical images. More specifically, an example in which radiographic images obtained using simple roentgenography are used as an example of the radiographic images will be described. The medical images applicable to the embodiments are illustrative only, and other medical images can also be suitably applied. Examples include medical images obtained using a computed tomography (CT) scanner, a magnetic resonance imaging (MRI) scanner, a three-dimensional ultrasonic imaging system, a photoacoustic tomography scanner, a positron emission tomography (PET)/single photon emission computed tomography (SPECT) scanner, an optical coherence tomography (OCT) scanner, and a digital radiography scanner.

The following embodiments illustrate building of a learning model based on supervised learning using a convolutional neural network (CNN) in which a low-resolution medical image, which is input data, and a high-resolution medical image, which serves as correct data, are used as training data. For this reason, the learning model is hereinafter referred to as CNN. Not the learning using the CNN but any machine learning capable of building a learning model capable of outputting medical images with improved resolution and reduced noise may be used.

First Embodiment

A medical-image processing apparatus according to this embodiment inputs a medical image to a learning model selected on the basis of the operation mode of a sensor used for capturing the medical image and generates a medical image of a resolution higher than that of the medical image.

Figure 1:
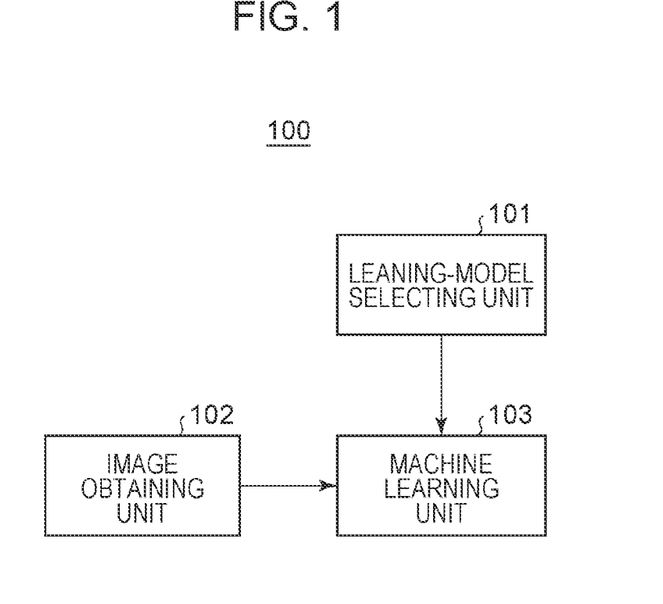
FIG. 1 is a block diagram of an example of the functional configuration of a medical-image processing apparatus according to a first embodiment.

FIG. 1 is a block diagram of a medical-image processing apparatus 100 according to the present invention. The medical-image processing apparatus 100 includes a learning-model selecting unit 101, an image obtaining unit 102, and a machine learning unit 103.

The learning-model selecting unit 101 obtains the operation mode of the sensor and outputs a learning model for machine learning. The image obtaining unit 102 obtains a radiographic image from an external device and outputs a low-resolution radiographic image. The machine learning unit 103 receives the low-resolution radiographic image and the learning model for machine learning as an input and performs inference processing of superresolution processing CNN and output a superresolution image.

Figure 2A:
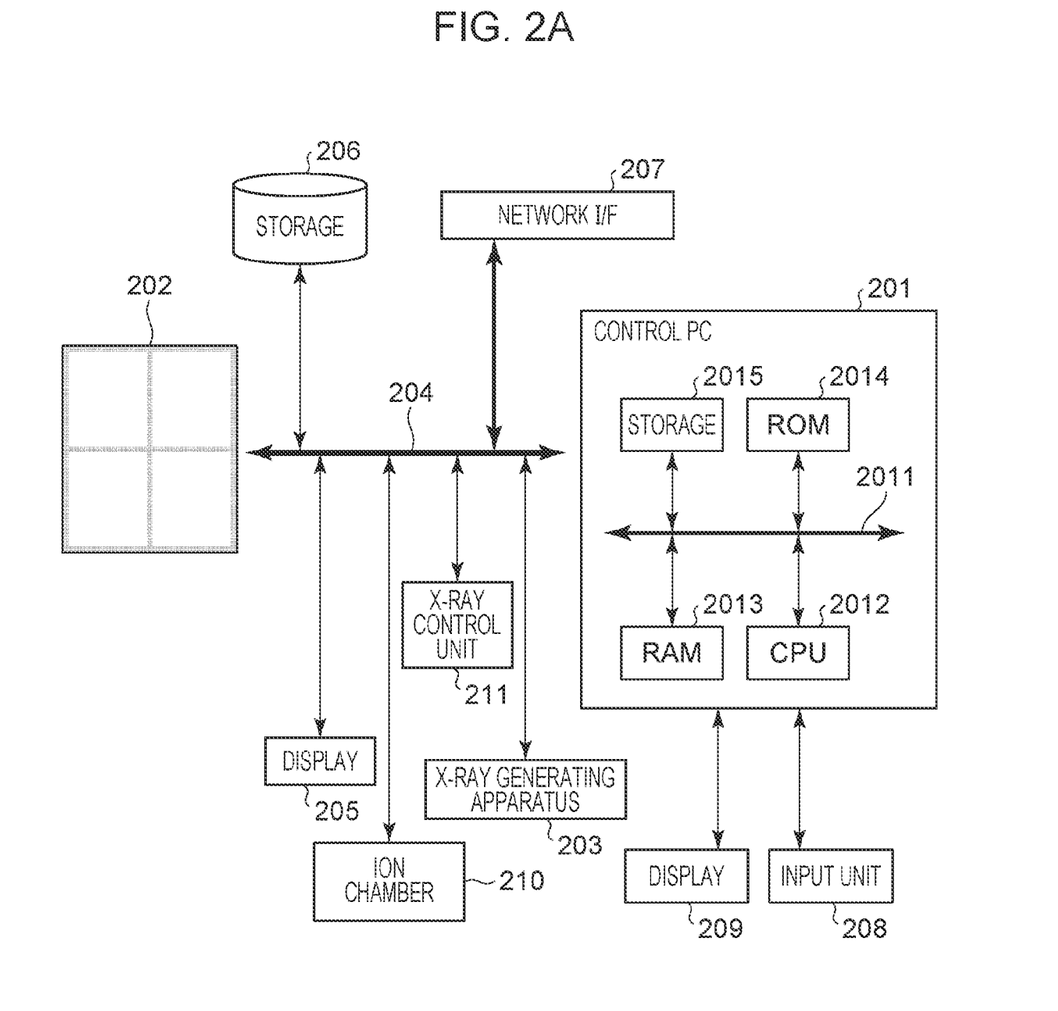
FIG. 2A is a diagram illustrating an example of the hardware configuration of the medical-image processing apparatus according to the first embodiment.
Figure 2B:
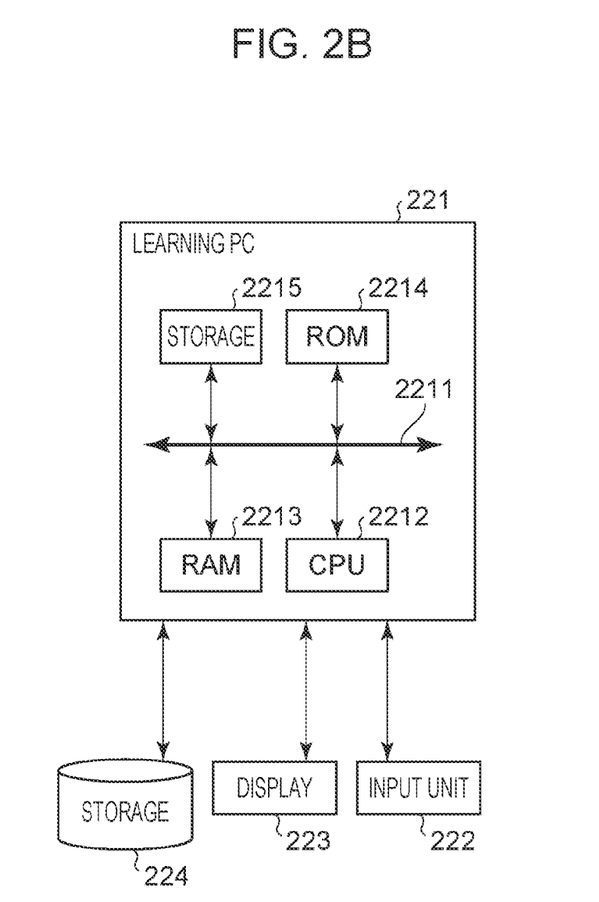
FIG. 2B is a diagram illustrating an example of the hardware configuration of the medical-image processing apparatus according to the first embodiment.

FIGS. 2A and 2B illustrate the hardware configuration of FIG. 1. In the configuration example in FIG. 2A, a radiographic image needed for learning is obtained. A control personal computer (PC) 201 and an X-ray sensor 202, such as a flat panel sensor, which converts an X-ray signal to a digital image and output it are connected by a Gigabit Ether 204. The signal line may be not the Gigabit Ether but a controller area network (CAN) or an optical fiber. The Gigabit Ether 204 connects to an X-ray generating apparatus 203, a display 205, a storage 206, a network interface 207, an ion chamber 210, and an X-ray control unit 211. The control PC 201 is configured such that, for example, a central processing unit (CPU) 2012, a random access memory (RAM) 2013, a read only memory (ROM) 2014, and a storage 2015 are connected to a bus 2011. The control PC 201 connects to an input unit 208 using a universal serial bus (USB) or a PS/2 port and connects to a display 209 using a DisplayPort or a digital visual interface (DVI). The control PC 201 is used to send commands to the X-ray sensor 202 and the display 205. In the control PC 201, processing details for each image-capturing mode are stored in the storage 2015 as software modules. The processing details are read to the RAM 2013 according to instruction means (not shown) for execution. The processed image is sent to the storage 2015 in the control PC 201 or the storage 206 outside the control PC 201 for storage.

The learning-model selecting unit 101, the image obtaining unit 102, and the machine learning unit 103 shown in FIG. 1 are stored in a storage 2215 as software modules. It is needless to say that the learning-model selecting unit 101, the image obtaining unit 102, and the machine learning unit 103 shown in FIG. 1 may be implemented as a dedicated image processing board. Optimum implementation for the purpose may be performed.

In the configuration example of FIG. 2B, the training of the CNN is performed. A learning PC 221 is configured such that, for example, a CPU 2212, a RAM 2213, a ROM 2214, and a storage 2215 are connected to a bus 2211. The learning PC 201 connects to an input unit 222 using a USB or PS/2, connects to a display 223 using DisplayPort or DVI, and connects to a storage 224 using a USB. In training the CNN, the machine learning unit 103 shown in FIG. 1 is stored in the storage 2215 as a software module. It is needless to say that the machine learning unit 103 shown in FIG. 1 may be implemented as a dedicated image processing board. Optimum implementation for the purpose may be performed.

Figure 3:
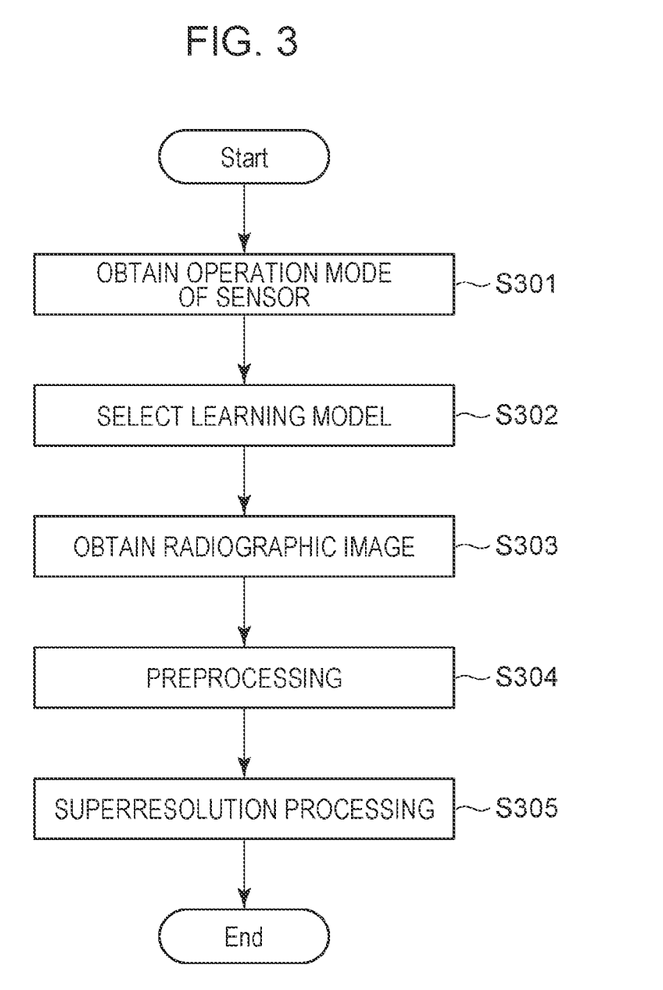
FIG. 3 is a flowchart of an example of the processing procedure of the medical-image processing apparatus according to the first embodiment.

The processing will be described with reference to the functional block diagram in FIG. 1 and the flowchart in FIG. 3 illustrating the overall processing procedure.

S301: Obtaining Operation Mode of Sensor

First at S301, the learning-model selecting unit 101 obtains the operation mode of the sensor in capturing an image of the examinee. The operation mode of the sensor is a method whereby the sensor generates an image and outputs it. Examples of the operation mode include a binning count, a method of adding pixels in the binning area, and a frame rate.

S302: Selecting Learning Model

Figure 4:
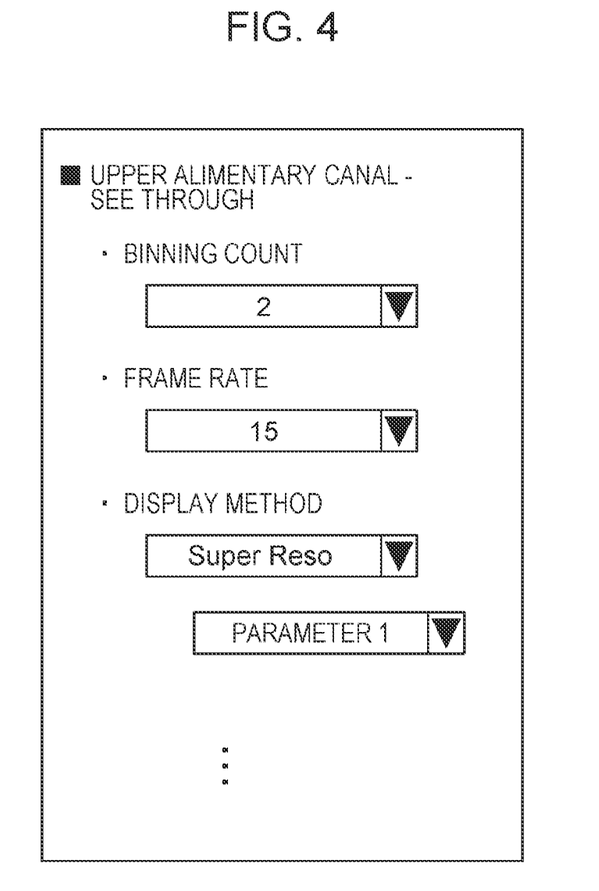
FIG. 4 is a diagram illustrating an example of the selection screen of the medical-image processing apparatus according to the first embodiment.

Next at S302, the learning-model selecting unit 101 selects a learning model on the basis of the operation mode of the sensor. The learning model is a training parameter set of the CNN that has performed supervised learning in advance. The association of the operation mode of the sensor with the learning model is set in advance. More specifically, the operation mode of the sensor and the learning model trained in advance using an image captured in the same operation mode as the operation mode of the sensor are associated with each other and is set. For example, a setting screen, as shown in FIG. 4, is displayed, and the user may set the association on the basis of the display. The learning model is set together with the operation mode of the sensor, such a binning count and a frame rate. The above setting method is illustrative only. Any method for associating the operation mode of the sensor with the learning model may be employed. For example, if additional information on the operation mode is associated with a medical image for use in training the learning model, the information may be read and associated with the learning model. A method for displaying images may be set in association with the operation mode of the sensor and the learning model.

Figure 5A:
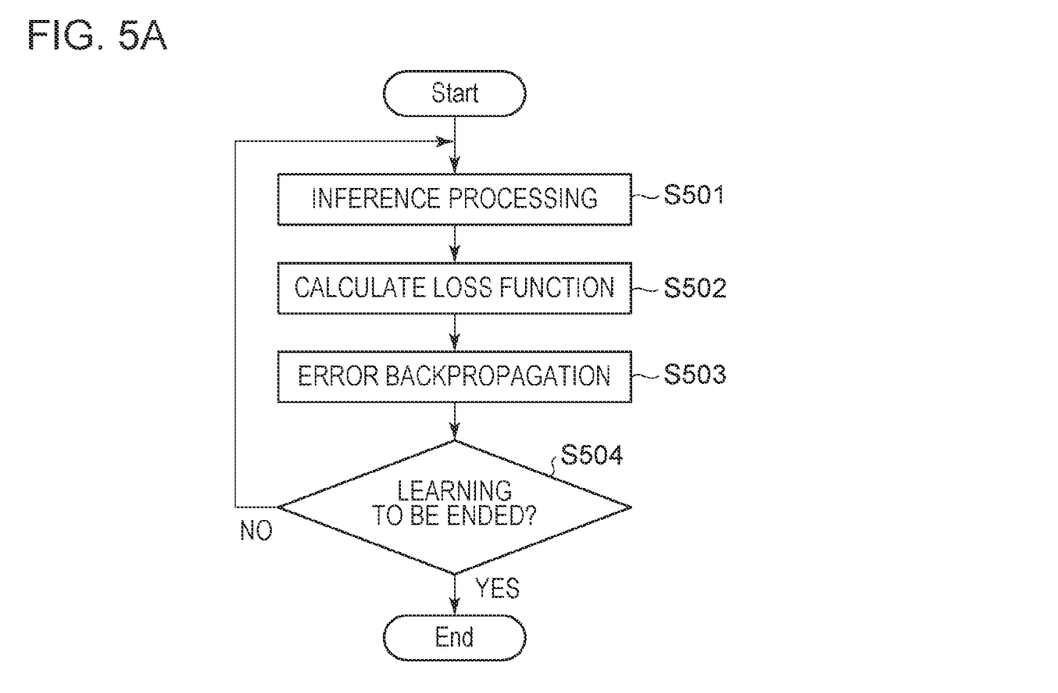
FIG. 5A is a flowchart of an example of the learning procedure of the medical-image processing apparatus according to the first embodiment.

The operation of the CNN at the training will be described with reference to FIGS. 5A and 5B.

S501: Inference Processing

At S501, the machine learning unit 103 builds a learning model by performing supervised learning using a set of input data and output data as training data. The training data is a set of low-resolution images 511, or input data, and high-resolution images 515, or correct data corresponding thereto. For the low-resolution images 511 and the high-resolution images 515 for use as training data, for example, the machine learning unit 103 converts the resolution of the high-resolution images 515 to generate the low-resolution images 511 of a lower resolution than the resolution of the high-resolution images 515. The resolution of the high-resolution images 515 subjected to a noise reduction process in advance may be converted to generate the low-resolution images 511 of reduced noise.

The machine learning unit 103 performs inference processing on the low-resolution images 511 using the parameters of a CNN 512 in the course of learning and outputs superresolution images 514 as inferences (S501). The CNN 512 has a structure in which multiple processing units 513 are freely connected. Example processes performed by the processing units 513 include a convolutional operation, a normalization process, and processes using an activating function such as ReLU or Sigmoid, for which a parameter set for describing the individual processing details is present. The parameters can take various structures. For example, parameter sets are connected in about three to hundreds layers in the order of convolutional operation, normalization, and activating functions.

S502: Calculating Loss Function

Next at S502, the machine learning unit 103 calculates a loss function from the superresolution images 514, which are inferences, and the high-resolution images 515. The loss function may be any function, such as a square error or a cross entropy error.

S503: Error Backpropagation

Next at S503, the machine learning unit 103 performs error backpropagation starting from the loss function calculated at S502 to update the parameter set of the CNN 512.

S504: Determining Whether to End Learning

Finally at S504, the machine learning unit 103 determines whether to end the learning, and if the learning is to be continued, goes to S501. Repeating the processes from S501 to 503 while changing the low-resolution images 511 and the high-resolution images 515 allows the update of the parameters of the CNN 512 to be repeated so that the loss function is decreased, thereby increasing the accuracy of the machine learning unit 103. When the learning is sufficiently advanced and is determined to be ended, the process is completed. The determination whether to end the learning is performed on the basis of criteria set for the problems, for example, that the accuracy of the inference has reached a fixed value or greater without occurrence of over-training or that the loss function has reached a fixed value or less.

Thus, the training of the CNN is performed.

Figure 5B:
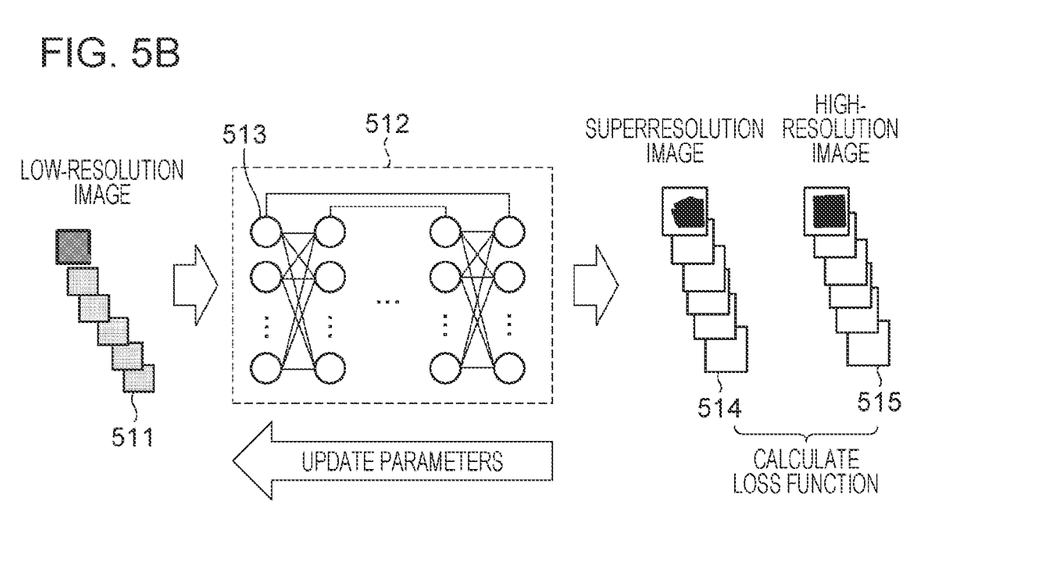
FIG. 5B is a flowchart of an example of the learning procedure of the medical-image processing apparatus of the first embodiment.
Figure 6A:
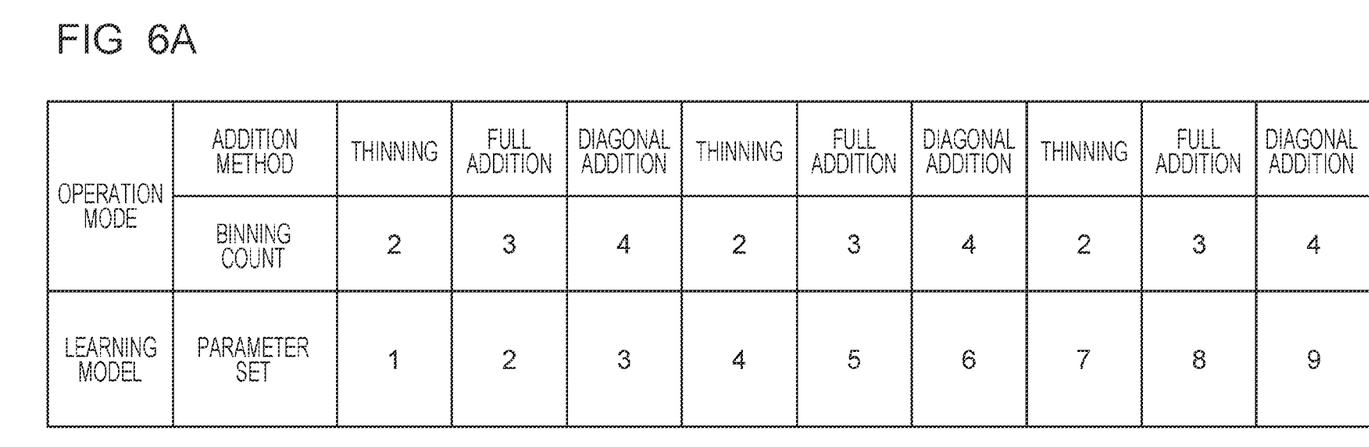
FIG. 6A is a table showing the relationship between the operation mode of the sensor and the learning model of the medical-image processing apparatus according to the first embodiment.
Figure 6B:
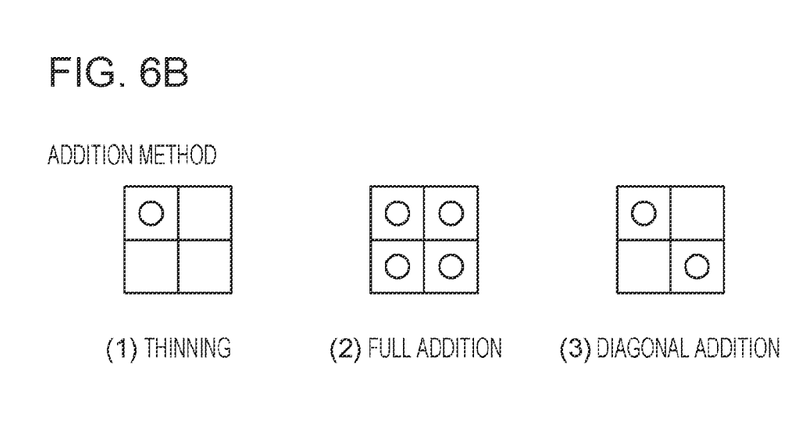

Examples of a combination of training parameters and the operation mode of the sensor are shown in FIG. 6A. A binning count and an addition method are shown as examples of the operation mode of the sensor. The binning process is a process of adding signals of multiple pixels of the X-ray sensor 202 to output the added values as a signal of one pixel. A binning count M refers to outputting an area of M×M as one pixel. In other words, a binning count 2 refers to outputting four pixels in a 2×2 area as one pixel. The binning area may be M x N (N is a number different from M). The addition method refers to group pixels to one pixel in binning. FIGS. 6B(1), (2), and (3) show examples of the addition method when the binning count is 2. The pixel with a circle is used in size reduction. For thinning, one pixel in the 2×2 area is used. For full addition, all the pixels are used. For diagonal addition, pixels to be used are diagonally selected. For addition, such as full addition or diagonal addition, the sum may be divided by the addition count to average them to make the pixel values equal. Filtering may be performed before the addition to prevent aliasing. If the binning count or the addition method differs, the process for generating high-resolution images from low-resolution images also differs, and therefore the content of learning of the CNN also differs. This requires to generate parameters by learning with a set of training data of the low-resolution images 511 and the high-resolution images 515 shown in FIG. 5B.

As shown in FIG. 6A, the operation mode of the sensor is selected to determine which parameter is to be used. The operation mode of the sensor is determined, for example, at the timing when the method of image capturing is determined. The method of image capturing is linked to the technique of image capturing. For this reason, if one technique for image capturing is selected, image capturing conditions and the operation mode are determined. Accordingly, the learning-model selecting unit 101 loads parameters to be used and applies data to a necessary memory area at the timing when the image capturing technique is determined. If there is room in the memory area, all the parameters may be loaded in advance, for example, at the start of the apparatus, and the data references may be changed at the timing when the technique for image capturing is determined.

S303: Acquiring Radiographic Image

Next at S303, the image obtaining unit 102 obtains an image from the X-ray sensor.

S304: Preprocessing

Next at S304, the image obtaining unit 102 preprocesses the obtained image to output a preprocessed image. The preprocessing is processing for preparing for superresolution processing. For example, the image obtaining unit 102 performs at least one of processing for correcting the characteristics of the sensor, frequency processing, and gradation processing. In the processing for correcting the characteristics of the sensor, offset correction, (dark-current correction), gain correction, and loss correction are performed to keep correlation with the peripheral pixels.

S305: Superresolution Processing

Finally at S305, the machine learning unit 103 receives the preprocessed image as an input, performs CNN inference processing using the learning model selected at S302, and outputs a superresolution image.

Thus, the processing of the medical-image processing apparatus 100 is performed.

As described above, a learning model is selected using a medical image, which is captured on the basis of the operation mode of the sensor at the image capturing, as an input, and a resolution-increased medical image as an output. The selected learning model has learned a medical image, in advance, captured in the same operation mode as the operation mode of the sensor at the image capturing. This matches the generation method for the input medical image with the generation method for the medical image used in training the learning model, allowing generation of a medical image with appropriated improved resolution.

In this embodiment, the addition method and the binning count are used as examples of the operation mode of the sensor. Alternative examples include the image obtaining rate (frame rate) and the reading area size of the sensor and other items related to a change in the sensor operation method. The operation mode of the sensor may be changed not only in a single sensor but also across a plurality of sensors. If the same addition method applies to the same sensor, the learning model is changed for each sensor.

There is no need to prepare different learning models for all operation modes. If a sensor operation mode that can be shared, such as an operation mode in which the process of generating high-resolution images from low-resolution images is the same, the same learning model may be used among the operation modes of the sensor.

Second Embodiment

Another embodiment of the learning model setting different from S302 in the first embodiment will be described with reference to the block diagram in FIG. 1 and the overall flowchart in FIG. 3.

S301: Obtaining Operation Mode of Sensor

First at S301, the learning-model selecting unit 101 obtains the operation mode of the sensor. The operation mode of the sensor is a pattern indicating how the sensor generates and outputs an image.

S302: Selecting Learning Model

At S302, the learning-model selecting unit 101 selects a learning model on the basis of the operation mode of the sensor. The learning model includes a learning network (CNN) that performed supervised learning in advance and CNN training parameters obtained by learning.

Figure 7A:
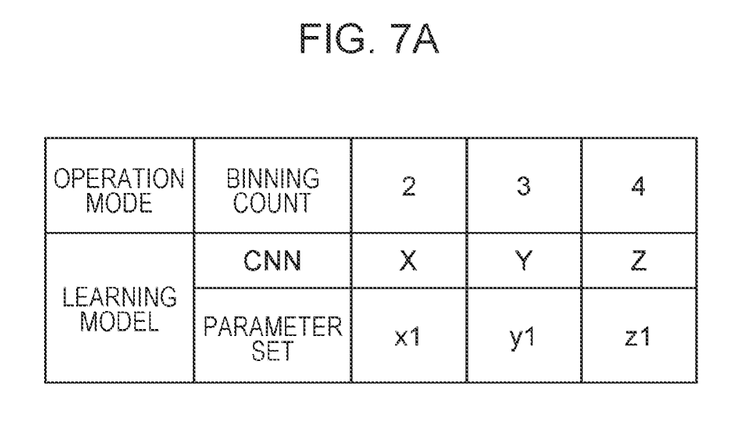
FIG. 7A is a table showing the relationship between the operation mode of the sensor and the learning model of the medical-image processing apparatus according to a second embodiment.

The operation of the CNN at the learning is the same as that of the first embodiment, and a description thereof is omitted. Examples of a combination of the learning model and the operation mode of the sensor are shown in FIG. 7A. An example of the operation mode of the sensor is a binning count. Increasing the binning count can increase the reading rate of the sensor, and the binning count is used for image capturing that requires a high frame rate. This requires higher performance for the CNN. In other words, different binning counts require different performance. For this reason, a CNN with faster processing speed is selected for the operation mode of a sensor with a greater binning count. In other words, for a second operation mode with higher operation speed than a first operation mode, a second learning model with higher processing speed than that of a first learning model associated with the first operation mode is set in association therewith.

For example, the number of processing units 513 constituting the CNN 512 in FIG. 5B may be changed for each binning. The processing speed is increased by reducing the number of processing units 513 as the binning count increases. Alternatively, the processing speed may be increased by decreasing the number input/output parameters for convolutional operation performed by the processing units 513 although the number of processing units 513 is kept unchanged. The number of parameters may be decreased by reducing the size of convolutional operation or reducing the number of output channels.

The steps from S303 to S305 are the same as those of the first embodiment, and descriptions thereof are omitted.

In this embodiment, the binning count is used as an example of the operation mode of the sensor. The same applies to another operation mode of the sensor related to an increase in the sensor operation speed.

Third Embodiment

Another embodiment of the learning model setting different from S302 of the first embodiment will be described with reference to the block diagram of FIG. 1 and the overall flowchart of FIG. 3.

S301: Obtaining Operation Mode of Sensor

At S301, the learning-model selecting unit 101 obtains the operation mode of the sensor. The operation mode of the sensor is a pattern indicating how the sensor generates and outputs an image.

S302: Setting Learning Model

At S302, the learning-model selecting unit 101 obtains a learning model on the basis of the operation mode of the sensor. The learning model includes the training parameters of the CNN that performed supervised learning in advance.

Figure 7B:
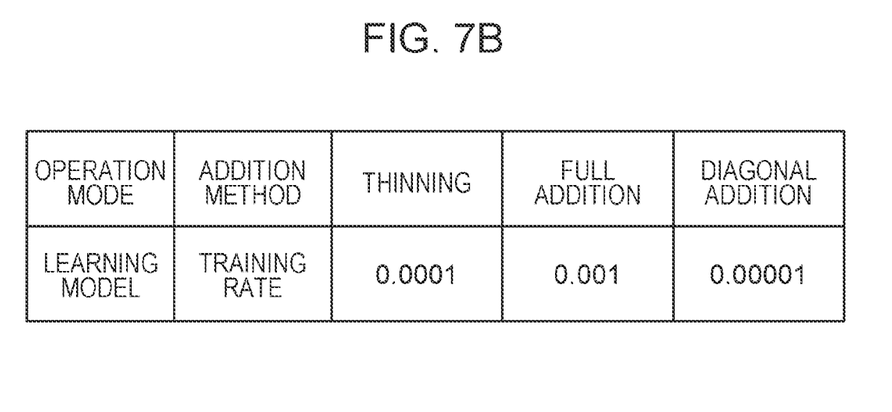
FIG. 7B is a table showing the relationship between the operation mode of the sensor and the learning model of the medical-image processing apparatus according to the second embodiment.

The operation of the CNN at the learning is the same as that of the first embodiment, and a description thereof is omitted. Examples of a combination of the learning model and the operation mode of the sensor are shown in FIG. 7B. An example of the operation mode of the sensor is an addition method. The difficulty in the expression of the CNN varies according to the addition method, and as a consequence, the degree of convergence of CNN learning varies. For this reason, the hyperparameters are changed according to the addition method to provide the optimum convergence without fluctuating the loss curve. One example of the hyperparameter is a training rate. The training rate is an error-reflected parameter, which is determined as follows. A gradient descent method is generally used to determine the parameters of the CNN 412. The parameter W of the CNN 412 is updated in the gradient descent method, as expressed as Eq. 1.

$$W := W - \alpha \nabla J(W) \qquad \text{Eq. 1}$$

where J is an error in the parameter W, := is assignment operation, $\nabla$ is gradient, and $\alpha$ is a training rate. Decreasing the value of $\alpha$ decreases the reflection of the error J on the parameter W, and increasing the value of $\alpha$ increases the reflection of the error J on the parameter W. Accordingly, for the addition method in which the loss curve fluctuates, the reflection of the error is decreased by decreasing the training parameter.

Steps from S303 to S305 are the same as those of the first embodiment, and descriptions thereof are omitted.

Although this embodiment uses the training rate as the hyperparameter, a batch size or an epoch count may be used.

Other Embodiments

It is to be understood that the present invention can also be implemented by supplying a program for implementing one or more functions of the above embodiments to a system or an apparatus via a network or a storage medium and by reading and executing the program with one or more processors of the computer of the system or the apparatus. The present invention can also be implemented by a circuit for performing one or more of the functions.

The processor or the circuit can include a central processing unit (CPU), a microprocessing unit (MPU), a graphics processing unit (GPU), an application specific integrated circuit (ASIC), and a field programmable gateway (FPGA).

The processor or the circuit can include a digital signal processor (DSP), a data flow processor (DFP), and a neural processing unit (NPU).

The medical-image processing apparatuses according to the embodiments may be realized as stand-alone apparatuses or may be a communicable combination of a plurality of apparatuses combined so as to execute the above processes, both of which are included in the embodiments of the present invention. The above processes may be executed by a common server or a server group. The plurality of units constituting each medical-image processing apparatus only needs to be able to communicate with one another at a predetermined communication rate and does not have to be present in the same facility or in the same country.

The embodiments of the present invention include a configuration in which a program of software for implementing the functions of the above embodiments is supplied to a system or an apparatus and the computer of the system or the apparatus reads and executes the code of the supplied program.

Accordingly, the program code installed in a computer to implement the processes according to the embodiments is also one of the embodiments of the present invention. The functions of the embodiments can also be implemented by part or all of the actual processes performed by an operating system (OS) operating in the computer according to instructions included in a program read by the computer.

The present invention allows generation of a medical image of appropriately improved resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A medical-image processing apparatus comprising:
an obtaining unit configured to obtain a medical image obtained by capturing an image of an examinee;
a setting unit configured to associate an operation mode, including at least one of a binning count and a frame rate, of a sensor at a time of the image capturing with a learning model selected based on the operation mode of the sensor; and
a generation unit configured to input the medical image to the learning model selected based on the operation mode of the sensor at the time of the image capturing to generate a medical image of a higher resolution than a resolution of the medical image,
wherein the setting unit associates a second operation mode having a higher sensor operation speed than an operation speed of a first operation mode with a second learning model having a higher processing speed than a processing speed of a first learning model set in association with the first operation mode.

2. The medical-image processing apparatus according to claim 1,
wherein the operation mode comprises at least one item of the binning count and THE frame rate, and
wherein the generation unit inputs the medical image to the learning model selected based on the at least one item.

3. The medical-image processing apparatus according to claim 1,
wherein the generation unit generates the medical image of a higher resolution than a resolution of the medical image obtained by the obtaining unit using a learning model that has learned training data including a medical image of a first resolution and a medical image of a second resolution lower than the first resolution, the medical image of the second resolution being obtained by converting the resolution of the medical image of the first resolution.

4. The medical-image processing apparatus according to claim 3,
wherein the generation unit generates the medical image of a higher resolution than the resolution of the medical image obtained by the obtaining unit using a learning model that has learned training data including a medical image of the first resolution subjected to a noise reduction process and a medical image of the second resolution lower than the first resolution, the medical image of the second resolution being obtained by converting the resolution of the medical image of the first resolution subjected to the noise reduction process.

5. A medical-image processing apparatus comprising:
an obtaining unit configured to obtain a medical image obtained by capturing an image of an examinee;
a setting unit configured to associate an operation mode, including at least one of a binning count and a frame rate, of a sensor at a time of the image capturing with a learning model selected based on the operation mode of the sensor; and
a generation unit configured to input the medical image to the learning model selected based on the operation mode of the sensor at the time of the image capturing to generate a medical image of a higher resolution than a resolution of the medical image,
wherein the setting unit associates an operation mode having a second binning count greater than a first binning count with a second learning model having a higher processing speed than a processing speed of a first learning model set in association with the operation mode having the first binning count.

6. The medical-image processing apparatus according to claim 1,
wherein the setting unit further sets a method for displaying the medical image generated by the generation unit.

7. The medical-image processing apparatus according to claim 1,
wherein the setting unit further sets a method for adding a plurality of pixels of the sensor in a binning process of adding outputs of signals of the plurality of pixels and outputting the outputs as a signal of one pixel.

8. The medical-image processing apparatus according to claim 1, wherein the medical image comprises a radiographic image.

9. The medical-image processing apparatus according to claim 1,
wherein the setting unit associates the operation mode of the sensor with the learning model that is trained in advance using an image captured in the same mode as the operation mode of the sensor.

10. A medical-image processing method comprising:
obtaining step of obtaining a medical image obtained by capturing an image of an examinee;
setting step configured to associate an operation mode, including at least one of a binning count and a frame rate, of a sensor at a time of the image capturing with a learning model selected based on the operation mode of the sensor; and
generation step of inputting the medical image to a learning model selected based on an operation mode of the sensor at the time of the image capturing to generate a medical image of a higher resolution than a resolution of the medical image, wherein the setting step associates a second operation mode having a higher sensor operation speed than an operation speed of a first operation mode with a second learning model having a higher processing speed than a processing speed of a first learning model set in association with the first operation mode.

11. A non-transitory computer-readable storage medium storing a program for causing a computer to execute the method according to claim 10.

12. A medical-image processing apparatus comprising:
an obtaining unit configured to obtain a medical image obtained by capturing an image of an examinee;
a setting unit configured to associate a frame rate, of a sensor at a time of the image capturing, with a learning model selected based on the frame rate of the sensor; and
a generation unit configured to input the medical image to the learning model selected based on the frame rate of the sensor at the time of the image capturing to generate a medical image of a higher image quality than an image quality of the medical image,
wherein the setting unit associates a second frame rate having a higher frame rate than a first frame rate with a second learning model having a shorter processing time than a processing time of a first learning model set in association with the first frame rate.

\* \* \* \* \*